Figure 1:
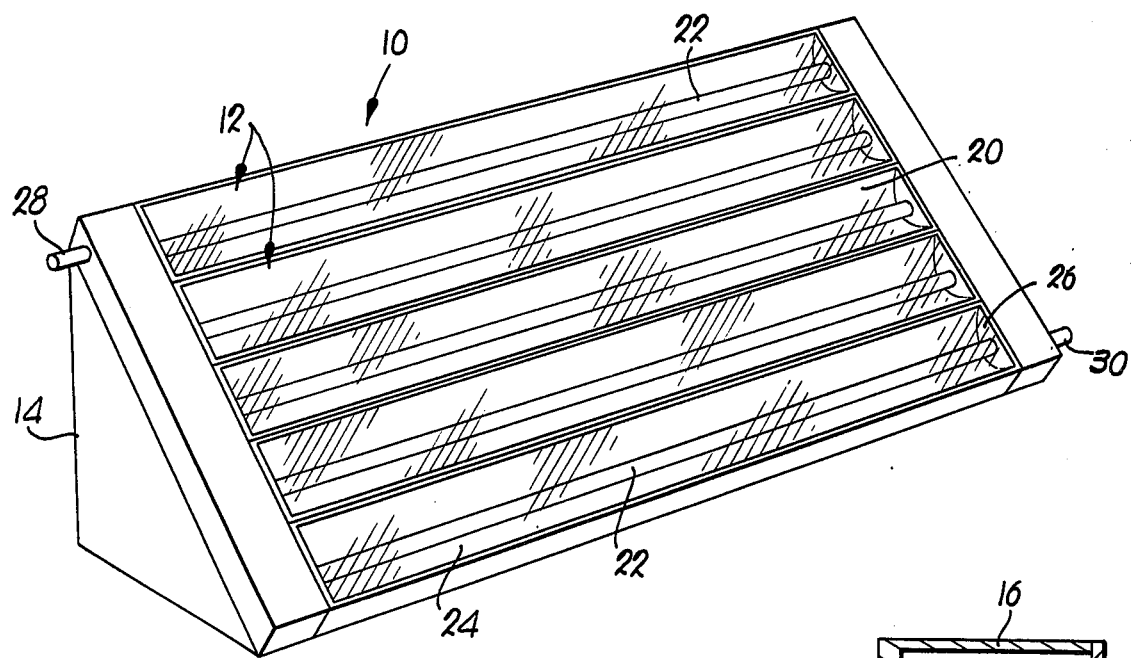

United States Patent [19]

Anderson

[11] 4,164,934
[45] Aug. 21, 1979

[54] ELLIPTICAL SOLAR REFLECTOR

[76] Inventor: Robert V. Anderson, 3900 Summercrest Dr., Fort Worth, Tex. 76109

[21] Appl. No.: 714,497

[22] Filed: Aug. 16, 1976

[51] Int. Cl.² .............................................. F24J 3/02
[52] U.S. Cl. .................................. 126/438; 136/89 PC
[58] Field of Search ............... 126/270, 271; 237/1 A; 350/288, 293, 294; 136/89 PC

[56] References Cited

U.S. PATENT DOCUMENTS

| | | | |
|---|---|---|---|
| 3,518,411 | 6/1970 | Rohde | 350/288 X |
| 3,866,285 | 2/1975 | Clark | 126/271 X |
| 3,957,031 | 5/1976 | Winston | 126/270 |
| 3,974,824 | 8/1976 | Smith | 126/271 |
| 3,990,430 | 11/1976 | Robertson | 126/270 X |
| 3,991,740 | 11/1976 | Rabl | 126/270 |
| 4,099,516 | 7/1978 | Caulier | 126/271 |

Primary Examiner—Carroll B. Dority, Jr.
Assistant Examiner—Larry Jones
Attorney, Agent, or Firm—Schmidt, Johnson, Hovey & Williams

[57] ABSTRACT

A fixedly supported, low cost solar energy collecting device having an elliptical solar reflector is provided which is capable of efficiently collecting and concentrating solar energy during all seasons and sun declinations notwithstanding complete elimination of mechanism for shifting the reflector to follow the sun's path. The collector includes an elongated, trough-like reflector which substantially coincides with a section of a focal end surface of an imaginary elliptical cylinder, with a heat exchange fluid tube positioned along the adjacent focal line of the imaginary elliptical cylinder; in this fashion, solar rays passing through or parallel to the remaining focal line of the imaginary cylinder and striking the reflector are focused onto the heat exchange tube, so that solar energy collection is concentrated without the necessity of precisely orienting the reflector relative to the sun. In preferred forms, a plurality of juxtaposed reflector units are provided in the collection device, with the reflector focal lines being positioned along a geographic east-to-west line and at an angle of elevation equal to the latitude of the collector's position on the earth.

11 Claims, 3 Drawing Figures

ELLIPTICAL SOLAR REFLECTOR

This invention relates to a solar energy collection device which includes one or more elliptical solar reflectors capable of efficiently collecting and focusing solar energy during all seasons of the year notwithstanding elimination of the need to shift the reflectors to compensate for changing sun declinations or the like.

A wide variety of solar energy collectors have been proposed in the past. In many instances, such collectors employ arcuate reflectors in combination with fluid-conveying conduits positioned at the focal point of the reflectors. In this manner, solar energy is focused onto the fluid-conveying conduits which hold a heat exchange fluid, so that the latter is heated to a relatively high temperature. This heated fluid can then be used to heat hot water for home use or for a wide variety of other purposes. One example of the above type of solar energy collection device is illustrated in the patent to Nichols, U.S. Pat. No. 1,014,972. This device employs elongated mirrors of parabolic cross-section, in conjunction with respective fluid pipes situated along the focal line of the parabolic reflectors.

A principal objection to the use of parabolic or hyperbolic reflectors stems from the fact that such reflectors must be directed essentially perpendicular to the sun's rays in order to achieve the most efficient collection of solar energy. That is, only those solar rays which are perpendicular to the parabolic reflector will be reflected to the focal line thereof; accordingly, in order to be most effective, such units are generally provided with mechanism for selectively shifting the reflector as needed for precise perpendicular orientation. Of course, this type of shifting mechanism measurably increases the complexity and cost of the collector.

Another type of solar energy collection device currently in use employs a flat surface inclined at an angle equal to the latitude of the collector's position on the earth. This flat surface is usually constructed with a serpentine fluid coil welded or bonded thereto. The flat supporting surface and coil are normally painted a dark color, usually black, to increase solar energy absorption. The chief faults of such devices relate to the absence of any reflectorized focusing structure, and to the fact that it is necessary to insulate the collecting surface from the ambient to avoid considerable heat loss.

A number of solar energy collection devices of the types described above, as well as others, are disclosed in French Pat. No. 1,338,881, German Pat. No. 524,943, and in the following U.S. patents U.S. Pat. Nos.: 1,014,972; 1,047,554; 1,258,405; 1,599,481; 1,661,473; 1,673,429; 2,467,885; 2,907,318; 2,969,788; 3,262,493; and 3,321,012.

Therefore, the most important object of the present invention is to provide a solar energy collection device which includes one or more elliptical reflector structures configured for permitting the device to be fixedly supported to thereby totally eliminate the need for conventional reflector-shifting mechanism while nevertheless retaining the high efficiency of the latter type of devices.

As a corollary to the foregoing, another object of the invention is to provide a solar energy collecting device which includes at least one elongated, trough-like elliptical reflector in conjunction with an elongated, fluid-conveying heat exchange pipe or tube spaced from the reflector and located for maximum focusing of solar energy onto the tube; in preferred forms, the elliptical reflector has the concave surface thereof reflectorized and is configured to substantially coincide with a section of a focal end surface of an imaginary elliptical cylinder, with the tube located along the focal line of the imaginary cylinder adjacent the reflector, so that solar rays passing through or parallel with the remaining focal line of the imaginary cylinder and striking the reflector are focused onto the heat exchange tube of the apparatus.

Another aim of the invention is to provide a solar energy collection device of the type described which includes a plurality of juxtaposed elliptical reflectors each having a corresponding fluid-conveying pipe or tube, along with structure fixedly supporting the reflectors and tubes so that the longitudinal axes of the reflectors extend approximately on a geographic east-to-west line and are inclined at an angle of elevation substantially equal to the latitude of the location of the reflectors on the earth's surface; this ensures maximum solar energy collection and concentration during all seasons and sun declinations without the necessity of reflector-shifting mechanism or the like.

Figure 2:
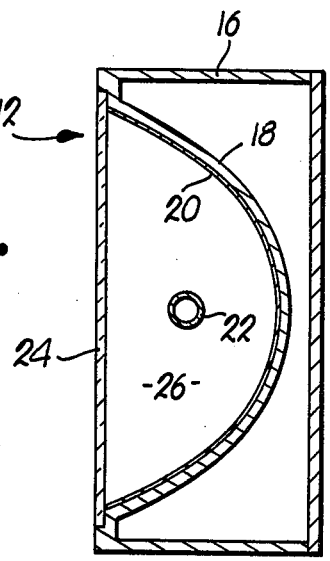
Figure 3:
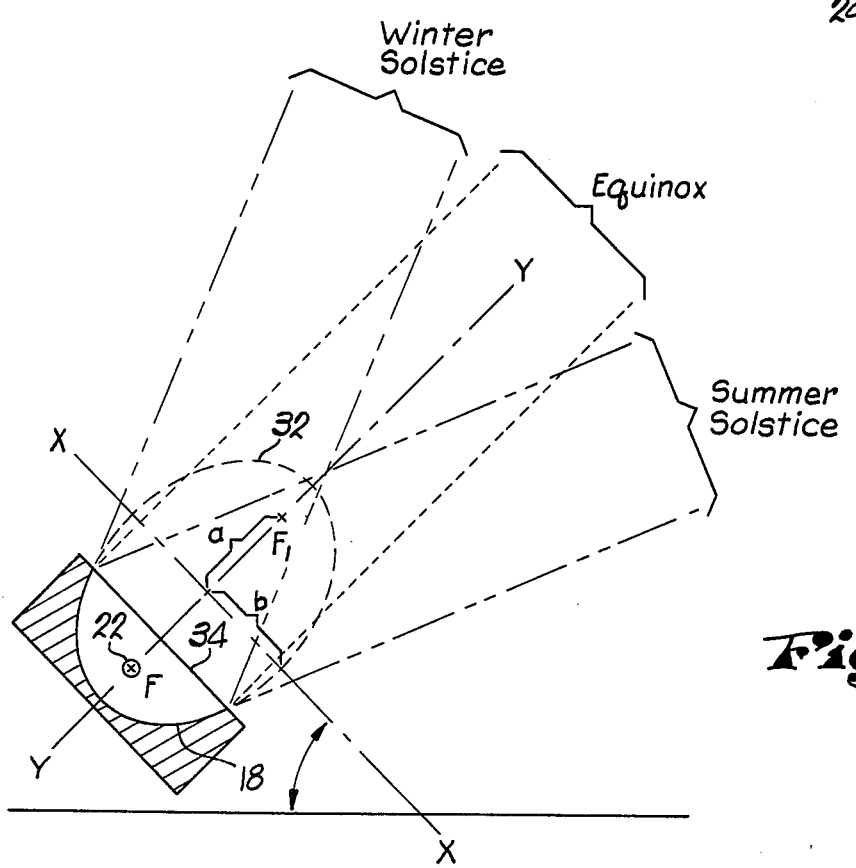

In the drawing:

FIG. 1 is a perspective view of a multiple-reflector solar energy collection device in accordance with the invention;

FIG. 2 is an enlarged vertical sectional view of one of the solar energy collection cells of the device illustrated in FIG. 1, and illustrates the elliptical configuration of the reflector and the position of the fluid-conveying tube relative thereto; and FIG. 3 is a schematic representation of the elliptical solar energy collection device of the invention mounted in energy-collecting disposition, and illustrates an imaginary elliptical cylinder partially coincident with the elliptical reflector to demonstrate the energy reflecting and focusing properties thereof.

A solar energy collecting device 10 illustrated in FIG. 1 broadly includes a plurality of juxtaposed collection cells 12 which are fixedly supported by means of frame structure 14 in an inclined, solar energy-collecting disposition. Although theoretically only a single cell 12 could be employed, in practice it is contemplated that a bank of cells would normally be used as depicted in FIG. 1.

Each cell 12 includes an elongated, box-like supporting structure 16, and an elongated, trough-like elliptical reflector 18 disposed within structure 16. The concave surface of reflector 18 presents a solar energy-reflecting surface by provision of a separate, mirror-like reflecting surface 20 applied to the concave face. Reflector 18 could be chrome-plated, if formed of steel; anodized, if made of aluminum; or silvered, if made of glass to form a mirror. Elongated, fluid-conveying tubular means 22 is situated within the confines of reflector 20 and along the adjacent focal line thereof as will be explained in detail hereinafter. Tubular means 22 is preferably dark in color to maximize heat absorption and is adapted to receive and convey a heat exchange fluid in the normal manner.

Box-like supporting structure 16 is also configured to receive and support an elongated, planar pane of transparent glass 24 which extends across the open end of reflector 18 in covering disposition to the latter as well as tube 22. As best seen in FIG. 1, the opposed ends of each reflector 18 are closed by sidewalls 26 which form a part of structure 16 and support the ends of tube 22 so that the latter is in spaced relationship to reflector 18 and pane 24.

In practice, when a plurality of cells 12 are used in a single collection device, header means (not shown) are normally provided for interconnecting the respective fluid-conveying tubes of the adjacent cells, so that only a single heat exchange fluid inlet 28 and outlet 30 (see FIG. 1) are required. This ensures the most efficient operation of device 10 with a minimum of equipment. Of course, inlet 28 and outlet 30 are conventionally coupled to additional heat exchange apparatus for making use of the solar energy gathered within device 10. Such additional apparatus can be in the form of a simple hot water storage tank or more complicated apparatus, as will be apparent to those skilled in the art.

Turning now to FIG. 3, the specific configuration of the elliptical reflectors used in the present invention, and the solar energy collecting and concentrating function thereof, will be explained in detail. First of all, it will be noted that reflector 18 substantially coincides with a section of a focal end surface of an imaginary elliptical cylinder referred to by the numeral 32. This imaginary elliptical cylinder presents, in cross-section, a two-dimensional ellipse, and is defined in part by a major plane along the Y-axis and a minor plane along the X-axis. Thus, reflector 18 presents, in cross-section, a section of a focal end of an ellipse. In addition, a pair of elongated focal lines F and $F_1$ are defined by imaginary cylinder 32.

A perusal of FIG. 3 will confirm that reflector 18 is configured such that a plane extending transversely across the open end thereof (i.e., along line 34 or in the position of pane 24) is disposed between focal lines F and $F_1$, and substantially parallel with the minor X-axis plane of cylinder 32. In addition, tubular means 22 is positioned substantially along focal line F for maximum focusing of solar energy from the reflector onto the elongated tube.

It will also be seen that reflector 18 is mounted so that the major plane of imaginary cylinder 32 is disposed at an angle of elevation substantially equal to the declination angle of the sun at the equinox. Also, the minor plane of cylinder 32 is at an angle of elevation substantially equal to the latitude of the location of the reflector on the earth's surface.

An important feature of the present invention stems from the fact that any solar rays passing through focal line $F_1$ and striking the reflectorized concave surface of reflector 18 will be focused along focal line F, the position of heat exchange tube 22. This focusing also occurs with any solar rays which are parallel to a ray passing through focal line $F_1$ and striking the reflectorized surface. Thus, it is possible to construct a truncated elliptical reflector of the type described to expose focal line $F_1$ to solar light rays and thereby obtain focus concentration along focal line F.

The importance of this consideration becomes apparent through a study of the illustrated positions of the sun relative to reflector 18. Thus, at the equinox, maximum solar collection is assured since the solar rays are perpendicular to the reflector and will pass through or parallel to focal line $F_1$. Similarly, during both the summer and winter solstices, solar rays will pass through and parallel to focal line $F_1$ and impinge upon the concave reflectorized surface of reflector 18, whereupon they will be focused and concentrated along focal line F, the position of tubular means 22. Thus, during all declinations of the sun, efficient solar energy collection is assured.

In preferred forms, the reflector is supported with the focal lines thereof extending along a geographic east-to-west line, so that solar energy collection during all daylight hours is possible without the necessity of tracking the sun along its daily arc.

Referring again to FIG. 3, it will be seen that the major semi-axis of the two-dimensional ellipse depicted is labeled as "a", while the minor semi-axis is labeled "b". In practice, it has been found that a ratio of "b" to "a" should be within the range of from about 0.70 to 0.87, in order to yield the most advantageous reflector having a focal line F in spaced relationship to the reflectorized concave portion of the reflector. This is preferred in order to ensure that tubular means 22 is suspended and surrounded by a non-conductive medium, such as air, so that there is no conductive heat loss from the heat-collecting tubular means to the reflectorized surface. Of course, a wide variety of other major semi-axis to minor semi-axis ratios can also be provided, but the above range is deemed most advantageous.

It will also be apparent that the spirit and scope of the present invention comprehends a wide variety of alterations from the preferred structure disclosed. For example, the reflector could be of greater or lesser arcuate cross-sectional length, this being primarily a matter of design choice.

Having thus described the invention, what is claimed as new and desired to be secured by Letters Patent is:

1. A solar energy collection device, comprising:
an elongated, trough-like elliptical reflector having the concave surface thereof reflectorized and which substantially coincides with a section of a focal end surface of an imaginary elliptical cylinder, said cylinder presenting and being defined in part by a pair of elongated, spaced focal lines;
elongated, solar energy-receiving means adapted to receive and utilize solar energy;
means mounting said solar energy-receiving means in spaced relationship to said concave reflectorized surface and substantially along the elongated focal line of said imaginary elliptical cylinder adjacent said focal end surface for maximum focusing of solar energy from the reflector onto said solar energy-receiving means;
solar energy-conveying cover means disposed over said solar energy-receiving means and the open end of said reflector; and
structure supporting said reflector and solar energy-receiving means for passage of at least certain of the sun's rays through or parallel to the remaining focal line of said cylinder and onto said reflectorized surface, in order to reflect and focus said rays onto said solar energy-receiving means.

2. A solar energy collection device, comprising:
an elongated, trough-like elliptical reflector having the concave surface thereof reflectorized and which substantially coincides with a section of a focal end surface of an imaginary elliptical cylinder, said cylinder presenting and being defined in part by a pair of elongated, spaced focal lines;
elongated, fluid-conveying tubular means adapted to receive a heat-exchange fluid;
means mounting said tubular means in spaced relationship to said concave reflectorized surface and substantially along the elongated focal line of said imaginary elliptical cylinder adjacent said focal end surface for maximum focusing of solar energy from the reflector onto said tubular means;

solar energy-conveying cover means disposed over said tubular means and the open end of said reflector; and structure supporting said reflector and tubular means for passage of at least certain of the sun's rays through or parallel to the remaining focal line of said cylinder and onto said reflectorized surface, in order to reflect and focus said rays onto said tubular means.

3. The solar energy collection device as set forth in claim 2 wherein said reflector is configured such that a plane extending transversely across the open end thereof is disposed between the focal lines of said imaginary elliptical cylinder.

4. The solar energy collection device as set forth in claim 2 wherein said reflector is configured such that a plane extending transversely cross the open end of said reflector is substantially parallel with the minor plane of said imaginary elliptical cylinder.

5. The solar energy collection device as set forth in claim 2 wherein said structure is constructed for supporting said reflector such that the minor plane of said imaginary elliptical cylinder is at an angle of elevation substantially equal to the latitude of the location of the reflector on the earth's surface.

6. The solar energy collection device as set forth in claim 2 wherein said structure is constructed for supporting said reflector such that the major plane of said imaginary elliptical cylinder is disposed at an angle of elevation substantially equal to the declination angle of the sun at the equinox.

7. The solar energy collection device as set forth in claim 2 wherein said structure is constructed for supporting said reflector with the focal line thereof extending approximately on a geographic east-to-west line.

8. The solar energy collection device as set forth in claim 2 wherein the ratio of the minor semi-axis to the major semi-axis of said imaginary elliptical cylinder is from about 0.70 to 0.87.

9. The solar energy collection device as set forth in claim 1 wherein said reflector is configured such that said focal line and tubular means are within the confines of the reflector.

10. The solar energy collection device as set forth in claim 9 wherein said cover means comprises a pane of transparent material in covering disposition to the open end of said reflector.

11. The solar energy collection device as set forth in claim 2 including a plurality of identical reflectors disposed in side-by-side relationship, each of said reflectors having a corresponding tubular means and cover means.

* * * * *